United States Patent [19]
Hohner et al.

[11] Patent Number: 5,437,044
[45] Date of Patent: Jul. 25, 1995

[54] VIRTUAL OPERATING UNIT FOR MICROPROCESSOR-CONTROLLED DEVICES

[75] Inventors: Heinz Hohner; Kurt Stoll, both of Esslingen, Germany

[73] Assignee: Festo KG, Esslingen, Germany

[21] Appl. No.: 979,914

[22] Filed: Nov. 23, 1992

[51] Int. Cl.⁶ ............................................. G06F 15/46
[52] U.S. Cl. ................................. 395/800; 395/275; 364/146; 364/976; 364/DIG. 2
[58] Field of Search ................... 395/800, 500, 275; 364/146, 976, DIG. 2

[56] References Cited

U.S. PATENT DOCUMENTS

| | | | |
|---|---|---|---|
| 4,710,863 | 12/1987 | Kaufmann et al. | 364/146 |
| 5,113,517 | 5/1992 | Beard et al. | 395/500 |
| 5,136,222 | 8/1992 | Yamamoto et al. | 318/568.2 |
| 5,198,990 | 3/1993 | Farzan et al. | 364/560 |

*Primary Examiner*—Alyssa H. Bowler
*Assistant Examiner*—John Harrity
*Attorney, Agent, or Firm*—Browdy and Neimark

[57] ABSTRACT

A personal computer or equivalent is programmed to create a virtual operating unit for a robotic device (eg., a micro-processor controlled machine, conveyor, etc.). The actual operating unit, which plugs into the robotic device and controls it, includes a keypad and a display. When reprogramming the machine, the operating unit is unplugged and the computer is plugged in. The computer can be switched between two modes. In a programming mode, the computer is used to modify the program in the robotic device microprocessor. In an operating mode, the computer mimics the operating unit to test the newly-entered program. On the computer screen are generated a virtual display (the image of the actual display of the operating unit) and a map of the operating unit keypad. The technician observes the virtual display on the computer screen and enters commands, indirectly, through the computer's keyboard instead of through the actual operating unit keypad. The virtual operating unit allows the robotic device program to be tested without disconnecting the personal computer and re-connecting the actual operating unit. The virtual keys may be highlighted, as by flashing, when the corresponding keys of the computer keyboard are touched.

9 Claims, 1 Drawing Sheet

VIRTUAL OPERATING UNIT FOR MICROPROCESSOR-CONTROLLED DEVICES

BACKGROUND OF THE INVENTION

The present invention relates to a device for programming and operating a stored program control device for a machine, a conveying means, production equipment, an assembly device, a mechanical handling device, or the like, comprising an operating unit for operation of the control device and a programming device adapted to be connected with the control device and having a picture screen.

At the present time such stored program control (SPC) devices are utilized for the control of a multiplicity of machine-related operations. The control program is stored in such control devices, operation by the operator being performed using an operating unit. Such an operating unit customarily possesses a key arrangement and frequently a display for the representation of the control functions or the condition of the machine and its components. In the case of such a device modification of the program is frequently necessary, for instance when new components are to be added, the sequence of the operation is to be modified or as part of further development a speedier or otherwise more expedient type o program is discovered. For this purpose there is the known practice of having separate operating units and stored program control devices, for instance by having a connection cable whose plug may be disconnected. Then the cable of a programming device is inserted into the respective socket, such programming device conveniently being in the form of a personal computer (PC). The program is then modified in the desired manner, that is to say the commands in the program storage means of the control device are altered. For this purpose it is necessary for the program storage means to be in the form of an EPROM, EEPROM or the like, for instance so as to render such program changes possible.

Once the desired change in the program has been performed, the operating unit is reconnected and with the aid of it the machine is operated with a new or altered program. Such modifications in the program or new programs however frequently still entail errors, which prevent proper running of the program. The programming device then has to be connected up again by insertion of the appropriate plug so that the necessary corrections may be performed. By the time the program is running properly such a change over between the operating unit and the programming unit will frequently be necessary a number of times over, something which is not only complex owing to changing over the plugs but also owing to the fact that the operator has to move between the operating unit and the programming unit, which are frequently arranged in separate rooms. The respective switching on and off is often very slow and awkward as well, since the programmer or, respectively, the operator has to be familiar with the new keyboard.

SHORT SUMMARY OF THE INVENTION

Accordingly one object of the present invention is to provide a device of the type initially mentioned by means of which modifications in the program may be more expediently performed than hitherto.

A still further aim of the present invention is to provide such a device with which testing of the program modifications is facilitated.

In order to achieve these and/or other objects appearing from the present specification, claims and drawings, in the present invention the programming device has a programming mode for programming or reprogramming the control device and an operating mode for the operation of the control device in lieu of the operating unit, means being provided for switching over between the programming mode and the operating mode and in the operating mode the picture screen displays the operating unit, a key arrangement, corresponding to the key arrangement of the operating unit, on the keyboard of the programming unit having the corresponding operating functions imparted to it.

Use of the device in accordance with the invention means that there is no longer any necessity to rearrange the plugs and the programmer or, respectively, the operator only has to use the programming device both for program modification and also afterwards for testing the control device and, respectively, the machine or for testing the operation of the machine as controlled by the control device using the new program. In this respect he does not have to move to a different working position, since such test procedure may be implemented using the keyboard of the programming device. After the respectively implemented change in the program, it is possible to switch over to the operating mode, in which the key arrangement of the operating unit is displayed on the picture screen of the programming device. Corresponding keys of the keyboard of the programming device are now given the operating functions with the result that the programmer has a chance of running the test in a known manner with the operating unit with which he is familiar, which however is only present in a displayed and functional manner. If the program still has bugs, it is possible then, without changing to another work station or without changing over plugs, to enter the programming mode. This change over may be repeated as frequently as desired. It is only when the program is free of defects that it is necessary to change over to the permanently installed operating unit. Testing is now no longer necessary, since the tests have already been implemented with the simulated or dummy operating unit.

The claims define further features and developments of the invention.

The display of the operating unit more particularly comprises its display unit and/or readout elements with the result that the operation of the control device can be implemented in the customary manner in the same manner as using the operating unit. The display of the operating unit appearing on the picture screen may then be utilized to show or simulate the monitor contents of the operating unit with the result that a complete simulation is possible. The representation of the operating unit is in this case preferably completely identical to it, including the operating and reproducing functions.

In order to implement an alternative connection between the control device and the operating unit or the programming device it is possible either to have a single plug connection or to have two parallel plug connections. In the first case the device in accordance with the invention has to be connected by rearranging the plugs, whereas in the second one this is unnecessary. In both cases however both programming and also the subsequent testing of the modified program naturally occurs with the aid of the keyboard of the programming device. The plug connections are in this respect preferably designed in the form of serial or parallel interfaces.

The means for switching over between the programming mode and the operating mode are preferably in the form of a program controlled switching over means adapted to be operated by actuation of keys or sequences of key strokes. This means that the switching over is possible for instance by operation of a series of keys of the keyboard of the programming device.

In order to render the association between the keyboard of the programming device and the displayed keyboard of the operating unit even clearer and more reliable are more readily apparent to the eye, means are provided for the optical marking of the key (which is respectively operated by one key of the keyboard of the programming device) of the displayed operation unit. Thus for instance by actuating one key of the keyboard of the programming device the associated key of the displayed operating unit can be caused to blink for a short time, before the actual operating function is implemented.

Further advantageous developments and convenient forms of the invention will be gathered from the following detailed account of one embodiment thereof in conjunction with the accompanying drawings.

LIST OF SEVERAL VIEWS OF THE FIGURES.

DETAILED ACCOUNT OF THE WORKING EMBODIMENT OF THE INVENTION

Figure 1:
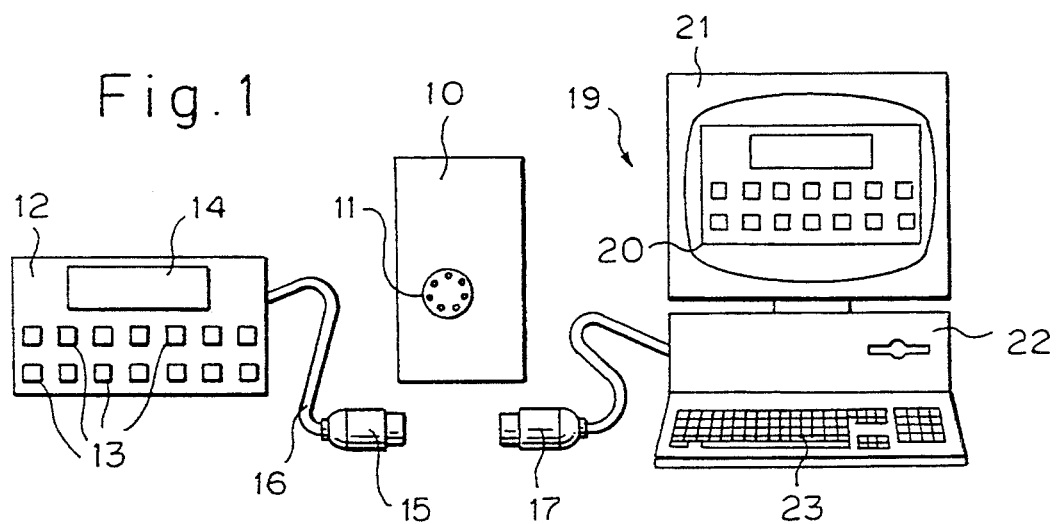
FIG. 1 is diagrammatic representation of a program controlled control device, which can be alternatively connected with the operating unit associated with it or with a programming device.

FIG. 1 shows a stored program control device (SPC) 10 in a merely diagrammatic manner. Such a stored program control device 10 is utilized in a known manner for the program control of a machine, a conveying means, production equipment, an assembly device, a mechanical handling device, or the like, so that a more detailed description of such a control device is unnecessary. The most significant component of such a control device is customarily constituted by at least one microcomputer, the control program being stored in a storage means such as an EPROM or an EEPROM. Access to the microcomputer comprised in the control device is by way of a serial or parallel interface, which is in the form of a plug socket 11. For the control of the control device 10 use is made of an operating unit 12, which has a keyboard or keypad 13 and a display 14. The operating unit 12 is connected with the control device 10 by insertion of a cable provided with a multipole plug 15 into the socket 11.

In use the operation of the control device 10 is by way of the keypad 13, the corresponding operation functions, working steps, conditions of the controlled machines or components thereof or the like, being able to be shown on a display screen 14. In addition to the display screen 14 or as an alternative thereto it is possible furthermore to have readout means such as LED's, mechanical indicating instruments or the like, which also indicate the conditions of the control device or of the machines controlled thereby.

If the control program in the control device 10 is to be altered, enlarged or replaced, instead of the plug 15 a plug 17 is inserted into the plug socket 11 which is in the form of an interface, which plug 17 is connected via a cable 18 with a programming 19 device constituted by a personal computer. However instead of a personal computer it is naturally possible to provide an other known programming device 19.

The programming device 19 consists of a monitor 21 having a picture screen 20, a computer housing 22 comprising the control unit, and a keyboard 23 and instead of the illustrated computer it is possible to have a smaller portable computer such as a laptop computer or a notebook computer.

The programming, reprogramming enlargement of the program and the like is performed by means of the programming device 19 in the customary manner so that no detailed description thereof is necessary. The program contained in the control device 10 is firstly read into the memory of the programming device 19, where it can be modified. The program control of the control device now takes place using the program in the memory of the programming device 19. After carrying out the programming the modified program is reloaded in the memory of the control device 10, that is to say, the program so far stored therein is overwritten. However instead of reading out the control program from the control device 10 it is possible for the programming device 19 to already contain a new or modified program and after a suitable test this program can be read into the control device 10, that is to say, the program so far stored therein is overwritten.

Figure 2:
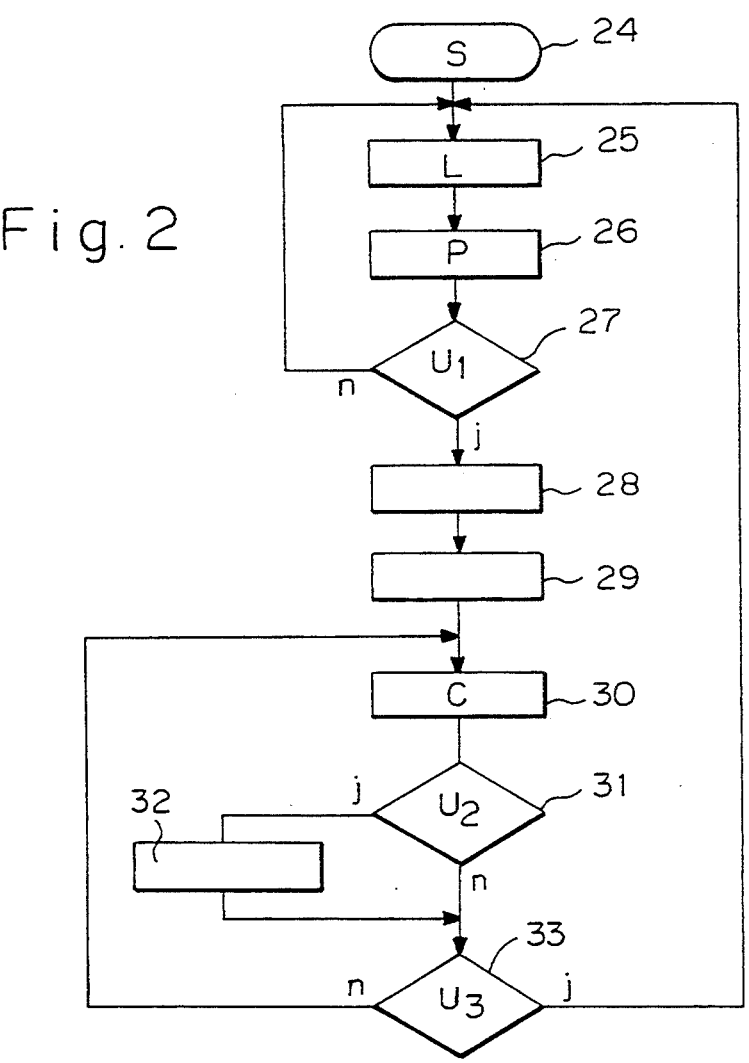
FIG. 2 is flow chart in order to explain the manner of operation.

The step of changing over between programming or writing and testing the modified program will now be explained in detail with reference to the flow chart shown in FIG. 2.

This flow chart shows the execution of the functions in the programming device 19 and, respectively, the execution of the program. On switching on the equipment the customary start up phase 24 of a program controlled device takes place. After this the programming device 19 will be in the programming mode, in which, in a load operation 25, the program contained in the control device 10 can be read into the memory of the programming device 19. Furthermore in a programming step 26 it is possible for this program to be modified, amplified or replaced. The modification of a control program is a known operation with a large number of possible variations, and there is no necessity to go into detail thereon. The programming device 19 remains in the programming mode or runs through a respective loop until a key combination U1 in the branch 27 is encountered. In this respect it can be a question of a combination of keys or of actuating a single key. If this condition is fulfilled, switching over into the operational mode takes place. In such mode there is firstly a picture screen control phase 28, in which an exact representation of the operating unit 12 on the picture screen 20 appears, as is shown in FIG. 1. After this in a keyboard associating or coordinating step 29 there is a coordination of the key functions of the keyboard 23 for the key functions of the keypad 13 of the illustrated operating unit 12. If as in the working embodiment the keypad 13 of the operating unit 12 consists of two rows of keys each with seven keys, then for example the respectively seven left keys of the two upper rows of keys of the keyboard 23 are coordinated with this keyboard 13. This means that the left upper part of the keypad 23 will now implement the functions of the keyboard 13 of the illustrated operating unit 12.

Furthermore the program ensures that on the display shown on the displayed operating unit the same representations appear as on the display 14 of the operating unit 12. It is now possible in the actual operating stage 30 for the operation of the control device 10 to take place in the customary manner, albeit with the aid of the top left part of the keyboard 23. In order to ensure coordination or correspondence of the top left part of the keyboard 23 with the displayed keys on the picture screen it is possible, for example, on actuating a key to cause the corresponding key to appear in a blinking mode or with an additional symbol on the picture screen for a short time in order to inform the operator which key on the imaginary keyboard he has hit on the picture screen. After this with some delay it is possible to implement the corresponding function. It is naturally possible as well to implement the corresponding simultaneously, or in other words directly on actuating the key. The operator may now remain in the operation stage 30 until the control device 10 or, respectively, the device or machine controlled by him has been sufficiently tested. If the result is satisfactory, he will use the key combination U2 with the result that in a branching step 31 there will be a switch over to a re-storing phase 32. In such phase the modified program will be reloaded in the control device 10, the program so far held therein being overwritten. If however the result of such test is unsatisfactory, the key combination U3 will be used and with the aid of a branching step 33 there will be a switching back into the programming mode or, respectively, programming operation 26.

The programmer or, respectively, the operator is consequently able to switch to and fro between the programming mode and the operating mode as frequently as desired until the multiply modified program leads to the desired results in the test sequence. After the re-storing phase 32 program modification is concluded, the programming device 19 can be disconnected from the control device 10 and the operating unit 12 may be connected with the plug socket 11 again.

We claim:

1. A system for programming and operating a stored program control device for a machine, the system comprising:
    a non-programmable operating unit having connection means for connecting with the control device for operating the control device, the operating unit including keys in a keypad arrangement;
    a programming unit adapted to be connected with the control device when the operating unit is not operatively connected with the control device, the programming unit functioning selectively in a programming mode and an operating mode wherein the programming unit mimics the operating unit;
    a keyboard coupled to the programming unit;
    a visual screen coupled to the programming unit;
    program switching means for switching between the programming mode and the operating mode;
    the programming unit including, in the programming mode, means for programming the control device;
    the programming unit including, in the operating mode, means for displaying on the screen a keypad image representing the keys in the keypad arrangement; and
    the keyboard selectively activating the control device according to the keypad arrangement.

2. The system according to claim 1, wherein:
    the operating unit further includes a first operating unit display; and wherein
    the programming unit further includes, in the operating mode, means for displaying on the screen a second display image corresponding to the first operating unit display.

3. The system according to claim 1, wherein
    the programming unit further includes, in the operating mode, picture means for creating on the screen an operating unit image corresponding to an appearance of the operating unit.

4. The system according to claim 1, wherein the programming unit is a personal computer.

5. The system according to claim 1, wherein the operating unit is connectable with the control device by a plug connection;
    the programming unit is adapted to be connected with the control device by the same plug connection; and
    the plug connection is adapted to connect the control device selectively to the operating unit and the programming unit.

6. The system according to claim 5, wherein the plug connection is a serial interface.

7. The system according to claim 5, wherein the plug connection is a parallel interface.

8. The system according to claim 1, wherein the switching means further comprises program switching means operable by the keyboard.

9. The system according to claim 1, further comprising means for highlighting a virtual key of the keypad image representing the keys in the keypad arrangement, the means for highlighting responsive to keyboard actuation.

* * * * *